May 26, 1925.
C. E. L. LIPMAN
VALVE STRUCTURE
Filed July 16, 1923
1,539,127
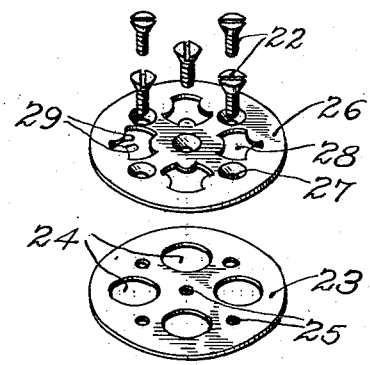
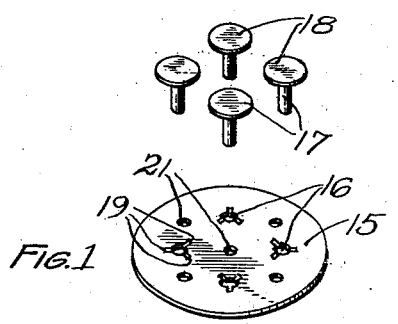
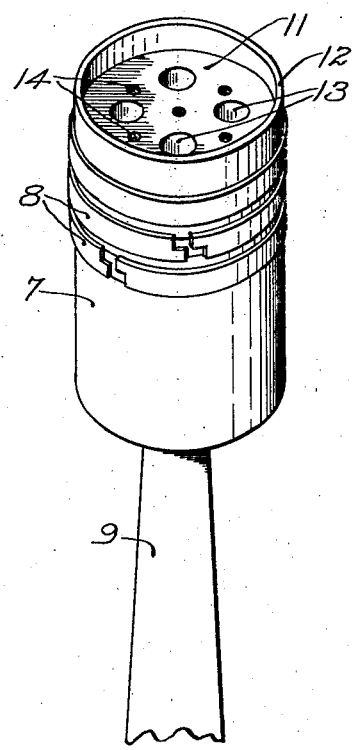
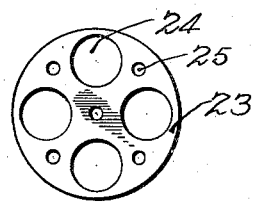
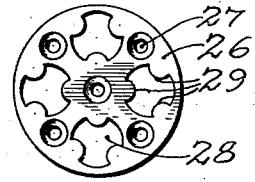
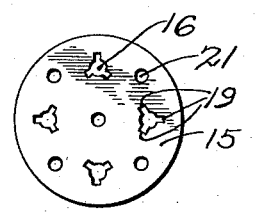
INVENTOR
Carl. E. L. Lipman
By Ira J. Wilson
ATTY.

Patented May 26, 1925.

1,539,127

UNITED STATES PATENT OFFICE.

CARL E. L. LIPMAN, OF BELOIT, WISCONSIN, ASSIGNOR TO LIPMAN REFRIGERATOR CAR AND MANUFACTURING COMPANY, OF BELOIT, WISCONSIN, A CORPORATION OF DELAWARE.

VALVE STRUCTURE.

Application filed July 16, 1923. Serial No. 651,719.

*To all whom it may concern:*

Be it known that I, CARL E. L. LIPMAN, a citizen of the United States, residing at Beloit, in the county of Rock and State of Wisconsin, have invented certain new and useful Improvements in Valve Structures, of which the following is a specification.

This invention relates in general to valve structures, and has more particular reference to check valves, the embodiment of the invention herein disclosed being particularly designed as an inlet valve construction adapted to be carried by a reciprocatory piston such as the compression piston of an ammonia compressor, or the like, customarily used in refrigerating apparatus.

While I am aware that intake valves have heretofore been mounted on said pistons, they have been of such construction that the valves were liable to stick, particularly, if oil should accumulate thereon, and furthermore, their construction was such that it was extremely difficult to grind the valve seats so as to insure a snug closing valve.

One of the primary purposes of my present invention is to provide a valve structure which shall be simple in construction and devoid of springs, one in which both the valves and their seats may be readily and accurately ground, one which can be economically manufactured and readily assembled and taken apart when necessary, and one which will be accurate, reliable, and efficient in operation and not liable to stick or get out of order in operation.

Other objects and advantages of the invention should be readily appreciated as the same becomes better understood, by reference to the following description, when considered in connection with the accompanying drawings.

Referring to the drawings:

Fig. 1 is a perspective view of a valve structure embodying my invention, the parts being shown in separated relation;

Fig. 2 is a fragmentary transverse sectional view of the valve structure;

Figs. 3, 4 and 5 are plan views of the intermediate upper and lower discs respectively; and Fig. 6 is a perspective view of one of the valves.

While it will be manifest that my invention is capable of embodiment in a variety of forms for different purposes, I have illustrated it herein as applied to the piston designated generally by reference character 7 of a compressor, the piston being shown as equipped with the usual rings 8 and adapted to be actuated by a connecting rod 9, as is customary. The upper end of the piston is shaped to provide an annular recess 11 surrounded by a longitudinally extending flange 12, preferably formed integrally with the piston head, and extending downwardly from this recess through the piston, is a plurality of inlet ports 13 through which the gas or other fluid to be compressed flows upwardly into the cylinder upon the downward stroke of the piston. The floor of this recess is also provided with a plurality of tapped openings 14 adapted to receive the fastening screws by which the valve structure is secured to the piston, as will be later explained.

Within this recess is disposed a lower disc 15 provided with ports 16 corresponding in number to the piston ports 13. Each of these ports comprises an annular portion through which the stem 17 of each valve 18 projects, the annular portion serving as a guide for such stem, and a radial slot 19 through which the fluid passes upwardly through the plate. These slots are of such length that they are completely covered by the valve heads 18 when the valves are seated, and by reason of the fact that the entire upper face of the plate 15 is exposed, this face may be accurately machined and ground so as to provide an accurate seat against which the correspondingly ground under face of the valves 18 snugly seat to prevent leakage. The plate is also provided with openings 21 through which the fastening screws 22 extend.

The disc 15 being disposed in the bottom of the piston recess 11, the valves 18 are supported upon the disc with the stems 17 projecting through the ports 16 and an intermediate or spacing disc 23 is then positioned upon the disc 15. This disc 23 is provided with apertures 24 of sufficient size to loosely accommodate the valves 18 and permit the upward flow of fluid around the valves. The disc is of greater thickness than the valves 18 so that opening and closing movements of the valves may take place. Holes 25 are also provided in the disc 23 through which the fastening screws 22 extend.

Upon the disc 23 there is disposed an upper disc 26 also provided with countersunk holes 27 for the fastening screws and equipped with ports 28 disposed above the valves and through which the fluid enters the cylinder above the piston. It will be observed that each of these ports 28 is provided with a plurality of inwardly extending portions or lips 29 which overlie at spaced intervals the margins of the valve 18 and serve as abutments to limit the opening movements of the valves and retain the valves against upward displacement. The surface contact between these projections and the valves is, however, small so that should oil accumulate on the upper faces of the valves, it would not cause the valves to stick in open position as the opposed surfaces are not large enough to cause such sticking action. When the discs and valves have been assembled in the piston recess as explained, they are all securely fastened together by the screws 22 which pass through the openings 27, 25, and 21 into the tapped sockets 14, thus securely fastening all of the parts together.

It should be apparent from the foregoing that I have provided a valve structure which is devoid of springs and comprises three flat discs, the lower of which may be accurately ground to insure a tight fit with the valves 18, the intermediate one of which serves as a spacing disc to permit the requisite reciprocatory movements of the valves and the upper of which retains the valves against displacement without liability of causing them to stick in operation. The fluid passing upwardly through the piston ports 13 flows under pressure through the ports 16 lifting the valves 18 against the action of gravity from their seats and thence flows around the valves through the openings 24 and the ports 28 into the cylinder above the piston. Upon compression stroke of the piston, the valves are quickly seated under gravity and are snugly held against their seats by the pressure of the fluid being compressed.

It is believed that my invention, its construction, manner of assembly and many of its inherent advantages will be understood and appreciated from the foregoing without further description, and it should be obvious that my invention is capable of embodiment in structures differing materially from that illustrated and described without exceeding the scope of the invention as defined in the following claims.

I claim:

1. A valve comprising, a body provided with an annular recess and ports opening into said recess, a lower ported disc disposed in said recess, valves suspended from said disc, said valves each comprising a head adapted to close a port of said disc and a stem guided in said port, a spacing disc provided with openings to receive said valve heads, said spacing disc being of greater thickness than said heads to permit opening movements of said valves, an upper ported disc adapted to limit the opening movements of said valves, and means for securing said discs to said body within said recess.

2. In a valve structure, the combination of a member provided with a plurality of ports, a disc provided with ports comprising central valve stem guiding portions and slots extending radially therefrom, valves for closing said ports, comprising stems disposed in said guiding portions and heads overlying said slots, a spacing disc adapted to accommodate said valve heads, and an upper disc provided with ports, marginal portions of which overlie at spaced intervals the heads of said valves to retain said valves in position.

3. In a valve structure, the combination of a member provided with longitudinally disposed ports, a disc provided with a corresponding number of ports adapted to serve as valve stem guides, valves comprising stems projecting through said disc ports and heads overlying said ports, a spacing disc provided with openings to receive said valve heads, an upper disc provided with ports, each port being shaped to partially overlie a valve head to retain the same against displacement, and means for securing said discs to said member.

4. In a valve structure, the combination of three superposed perforated discs, valves adapted to reciprocate in the perforations of the intermediate disc and to close the ports of the lowermost disc, said uppermost disc being shaped to prevent displacement of said valves, and means for securing said discs together.

5. In a valve structure, the combination of a bottom disc provided with a port, a valve supported by said disc and adapted to close said port, a central disc provided with an opening in which said valve is adapted to reciprocate, and a top disc provided with a port above the valve shaped to overlie the valve at spaced intervals and retain said valve against displacement.

6. A valve comprising, a body provided with longitudinally disposed ports and having a longitudinally extending flange at its upper end enclosing an annular recess into which said ports open, three discs adapted to be disposed in superposed relation in said recess, each of said discs being provided with ports, valves adapted to close the ports in the bottom disc, the intermediate disc being of sufficient thickness to permit reciprocatory movements of the valves therein and the top disc being adapted to limit the upward movement of said valves, and means for securing said discs to said body within said recess.

7. A valve comprising, a body portion having a recess in the axis of its direction of reciprocation, a port communicating between the recess and the opposite end of the body portion, a removable valve seat member in said recess, a valve for said seat, valve retaining means providing an outlet for fluids passing said valve and spaced from said seat member, and means passing through said retaining means and seat member to secure said retaining means.

CARL E. L. LIPMAN.